United States Patent
Mehta (10) Patent No.: US 11,679,733 B2
(45) Date of Patent: Jun. 20, 2023

(54) AIRBAG SHIELD FOR SEAT FRAME

(71) Applicant: TOYOTA BOSHOKU KABUSHIKI KAISHA, Aichi-Ken (JP)

(72) Inventor: Pritpal Singh Mehta, Novi, MI (US)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/490,573

(22) Filed: Sep. 30, 2021

(65) Prior Publication Data

US 2022/0105892 A1 Apr. 7, 2022

Related U.S. Application Data

(60) Provisional application No. 63/087,705, filed on Oct. 5, 2020.

(51) Int. Cl.
*B60R 21/207* (2006.01)
*B60N 2/68* (2006.01)

(52) U.S. Cl.
CPC .............. *B60R 21/207* (2013.01); *B60N 2/68* (2013.01)

(58) Field of Classification Search
CPC ................................. B60R 21/207; B60N 2/68
See application file for complete search history.

(56) References Cited

U.S. PATENT DOCUMENTS

| | | |
|---|---|---|
| 5,765,867 A | 7/1998 | French |
| 5,899,495 A | 5/1999 | Yamamoto et al. |
| 6,070,904 A | 6/2000 | Ozaki et al. |
| 6,371,510 B1 | 4/2002 | Marriott et al. |
| 6,874,810 B2 | 4/2005 | Soderquist |
| 7,314,228 B2 | 1/2008 | Ishiguro et al. |
| 7,597,343 B2 | 10/2009 | Miwa et al. |
| 7,631,894 B2 | 12/2009 | Hasebe et al. |
| 7,695,013 B2 | 4/2010 | Kakstis et al. |
| 7,770,925 B2 | 4/2010 | Seymour et al. |
| 7,823,912 B2 | 11/2010 | Tracht et al. |
| 7,845,683 B2 | 12/2010 | Sato et al. |
| 8,231,140 B2 | 7/2012 | Maripudi et al. |
| 8,272,664 B2 | 9/2012 | Benny et al. |
| 9,358,909 B2 * | 6/2016 | Jeong .................... B60R 21/207 |
| 9,682,678 B2 | 6/2017 | Rose et al. |
| 2003/0189319 A1 | 10/2003 | Soderquist |
| 2003/0234520 A1 | 12/2003 | Hawthorn et al. |
| 2004/0195808 A1 | 10/2004 | Amamori |
| 2005/0001410 A1 | 1/2005 | Evans |
| 2007/0164541 A1 | 7/2007 | Soderquist et al. |
| 2010/0066059 A1 | 3/2010 | Klinkenberger et al. |
| 2010/0301589 A1 | 12/2010 | Daita et al. |
| 2011/0088356 A1 | 4/2011 | Lachat et al. |

FOREIGN PATENT DOCUMENTS

WO WO-2019194197 A1 * 10/2019 ........... B60N 2/3075

* cited by examiner

*Primary Examiner* — Faye M Fleming (74) *Attorney, Agent, or Firm* — Greenblum & Bernstein, P.L.C.

(57) ABSTRACT

A vehicle seat assembly includes a seat back frame having an edge, a seat back frame shield having an edge, and an airbag. The seat back frame shield is mounted to the seat back frame and protects the airbag from the seat back frame.

18 Claims, 8 Drawing Sheets

AIRBAG SHIELD FOR SEAT FRAME

CROSS-REFERENCE TO RELATED APPLICATION

This application claims the benefit of U.S. Provisional Application No. 63/087,705 filed on Oct. 5, 2020.

BACKGROUND

An airbag needs protection from vehicle components during deployment of the airbag.

SUMMARY

In one example, a vehicle seat assembly includes a seat back frame having an edge, a seat back frame shield having an edge, and an airbag. The seat back frame shield is mounted to the seat back frame and protects the airbag from the seat back frame.

In another embodiment, the seat back frame includes a flange and the seat back frame shield includes a flange, and the flange of the seat back frame shield engages the flange of the seat back frame.

In another embodiment, a portion of the seat back frame shield wraps around the seat back frame.

In another embodiment, the seat back frame has a contour, and the seat back frame shield has a contour. The contour of the seat back frame shield correlates the contour of the seat back frame.

In another embodiment, the seat back frame shield has a thickness of approximately 1.5 mm.

In another embodiment, the seat back frame shield comprises plastic.

In another embodiment, an armrest bracket has an edge, and the vehicle seat assembly includes an armrest bracket shield having an edge. The armrest bracket shield is mounted to the armrest bracket, and the armrest bracket shield protects the airbag from the armrest bracket.

In another embodiment, the armrest bracket includes a first flange and a second flange and the armrest bracket shield includes a first flange and a second flange. The first flange and the second flange of the armrest bracket shield engages the first flange and the second flange, respectively, of the armrest bracket.

In another embodiment, a portion of the armrest bracket shield wraps around the armrest bracket.

In another embodiment, the armrest bracket has a contour and the armrest bracket shield has a contour, and the contour of the armrest bracket shield correlates the contour of the armrest bracket.

In another embodiment, the armrest bracket shield has a thickness of approximately 1.5 mm.

In another embodiment, the armrest bracket shield comprises plastic.

In another example, a vehicle seat assembly includes a seat back frame having an edge and a flange and a seat back frame shield having an edge and a flange. The seat back frame shield is mounted to the seat back frame, and the edge of the seat back frame shield aligns with the edge of the seat back frame. The flange of the seat back frame shield engages the flange of the seat back frame to protect the airbag from the seat back frame, the seat back frame shield has a thickness of approximately 1.5 mm, and the seat back frame shield comprises plastic. The vehicle seat assembly includes an armrest bracket having an edge, a first flange, and a second flange. The vehicle seat assembly includes an armrest bracket shield having an edge, a first flange, and a second flange, and the armrest bracket shield is mounted to the armrest bracket. The edge of the armrest bracket shield aligns with the edge of the armrest bracket, and the first flange and the second flange of the armrest bracket shield engages the first flange and the second flange, respectively, of the armrest bracket to protect the airbag from the armrest bracket. The armrest bracket shield has a thickness of approximately 1.5 mm, and the armrest bracket shield comprises plastic. The vehicle seat assembly incudes an airbag, and the seat back frame shield and the armrest bracket protects the airbag from the seat back frame and the armrest bracket, respectively.

In another embodiment, the armrest bracket has a contour and the armrest bracket shield has a contour, and the contour of the armrest bracket shield correlates the contour of the armrest bracket.

In another embodiment, the seat back frame has a contour and the seat back frame shield has a contour, and the contour of the seat back frame shield correlates the contour of the seat back frame.

DETAILED DESCRIPTION

Figure 1:
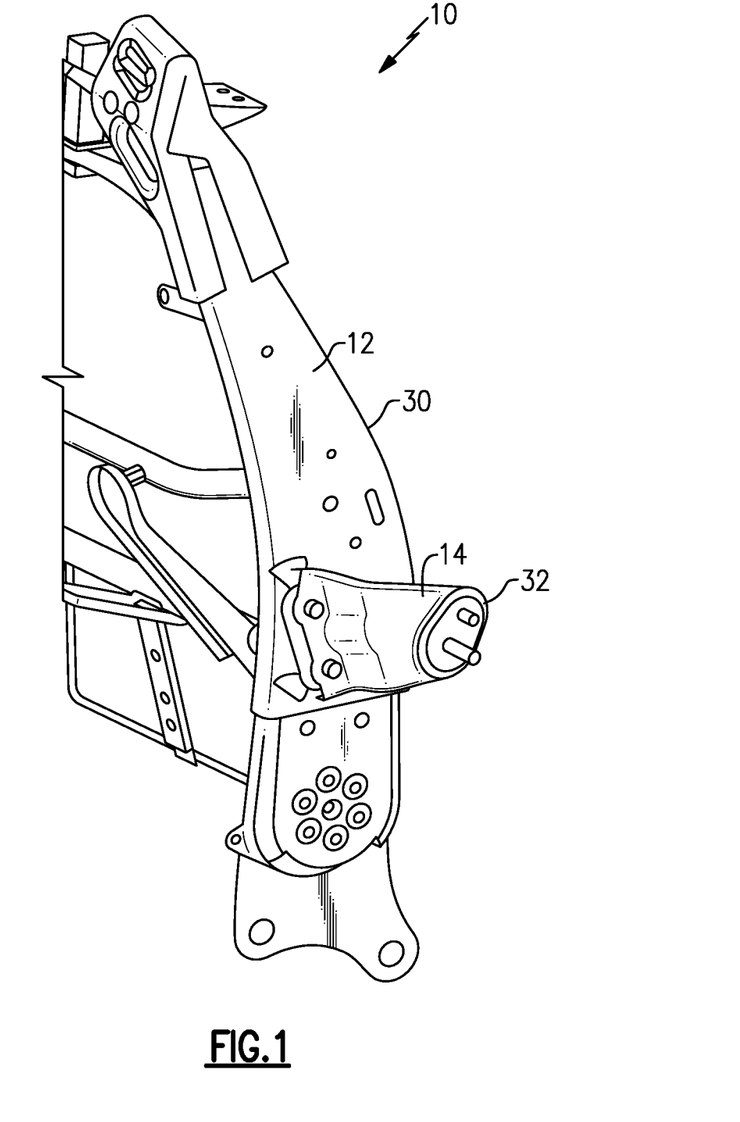
FIG. 1 illustrates a back frame of a vehicle seat.
Figure 2:
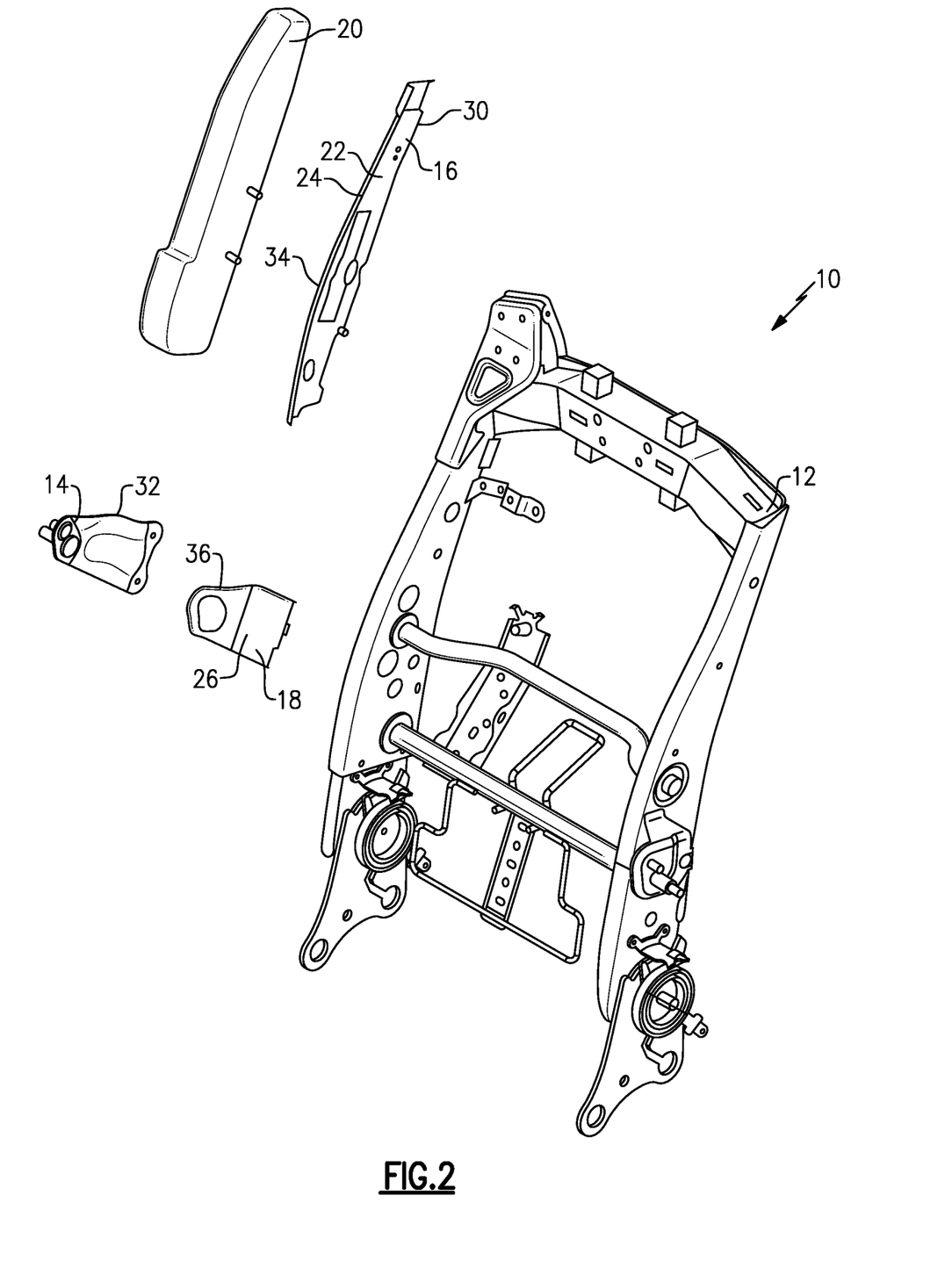
FIG. 2 illustrates a perspective exploded view of the vehicle seat, a seat back frame shield, and an armrest bracket shield.

FIG. 1 shows a vehicle seat 10 including a seat back frame 12 and an armrest bracket 14. In one example, the seat back frame 12 and the armrest bracket 14 are made of metal. FIG. 2 shows the seat back frame 12 and the arm bracket 14 and a corresponding seat back frame shield 16 and an armrest bracket shield 18, respectively, in exploded view. The seat back frame 12 includes a flange 38, and the armrest bracket 14 includes a first flange 40 and a second flange 42. The seat back frame shield 16 includes a main body 22 and a flange 24, and the armrest bracket shield 18 includes a main body 26 and a first flange 28 and a second flange 44. In one example, the seat back frame shield 16 and the armrest bracket shield 18 are made of plastic.

The seat back frame 12 includes an edge 30, and the armrest bracket 14 includes an edge 32. The seat back frame shield 16 includes an edge 34, and the armrest bracket shield 18 includes an edge 36. When the edge 34 of the seat back frame shield 16 aligns with the edge 30 of the seat back frame 12, and the seat back frame shield 16 is mounted on the seat back frame 12. When the edge 36 of the armrest bracket shield 18 aligns with the edge 32 of the armrest bracket 14, and the armrest bracket shield 14 is mounted on the armrest bracket 14. In one example, the edge 30 of the seat back frame 12 and the edge 36 of the armrest bracket 14 extending around the perimeter. A seat side airbag 20 is mounted on the seat back frame 12 of the vehicle seat 10, and the airbag 20 is positioned proximate to the seat back frame 12 and the armrest bracket 14.

Figure 3:
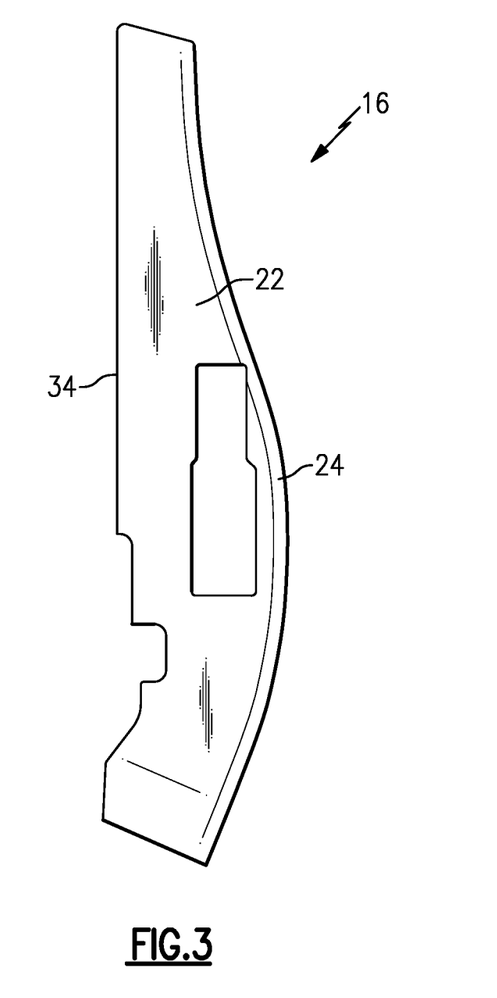
FIG. 3 illustrates a front view of the seat back frame shield.
Figure 4:
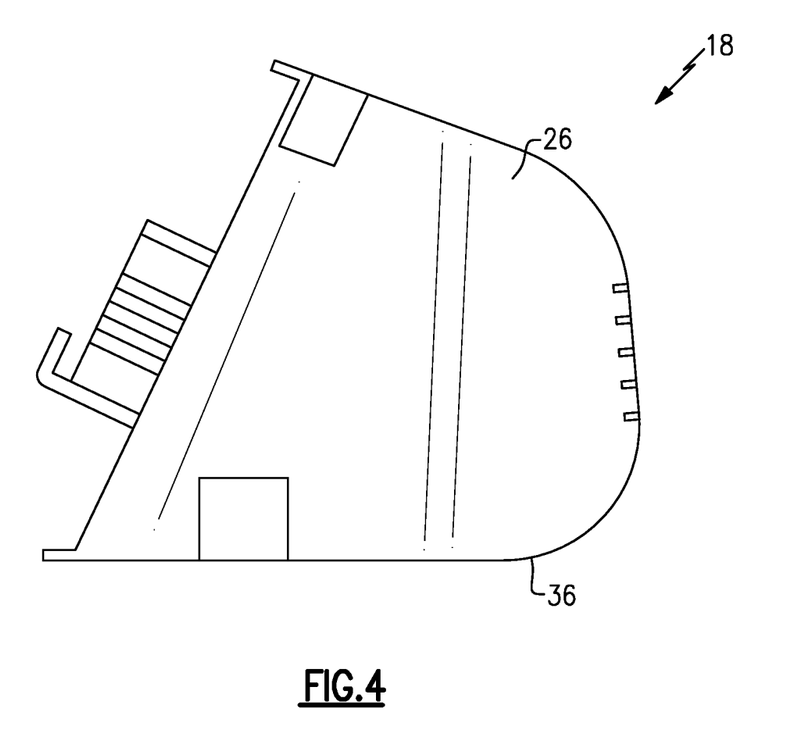
FIG. 4 illustrates a front view of the armrest bracket shield.

As shown in FIGS. 3 and 4, the seat back frame shield 16 and the armrest bracket shield 18 are mounted to the seat back frame 12 and the armrest bracket 14, respectively, to cover the seat back frame 12 and the armrest bracket 14 to protect the airbag 20. When the airbag 20 deploys, the seat back frame shield 16 and the armrest bracket shield 18 protect the airbag 20 from the seat back frame 12 and the armrest bracket 14, preventing potential damage to the airbag 20. The seat back frame shield 16 and the armrest bracket 14 are specially designed to protect the airbag 20 from the seat back frame 12 and the armrest bracket 14, respectively, during airbag 20 deployment. When an airbag 20 deploys, the seat back frame shield 16 and an armrest bracket 14 cover specific areas of the seat back frame 12 and the armrest bracket 14 require to protect the airbag 20, such as from sharp edges.

The seat back frame shield 16 and the armrest bracket shield 18 are attached to the seat back frame 12 and the armrest bracket 14, respectively, at the desired location. The seat back frame shield 16 and the armrest bracket 14 provide tight package protection to the airbag 20 at the design stage and provides risk protection during airbag 20 deployment evaluation. If any changes are needed, it is easier to modify the seat back frame shield 16 and the armrest bracket 14 than the seat back frame 12 and the armrest bracket 14 in terms of cost and time.

Figure 5:
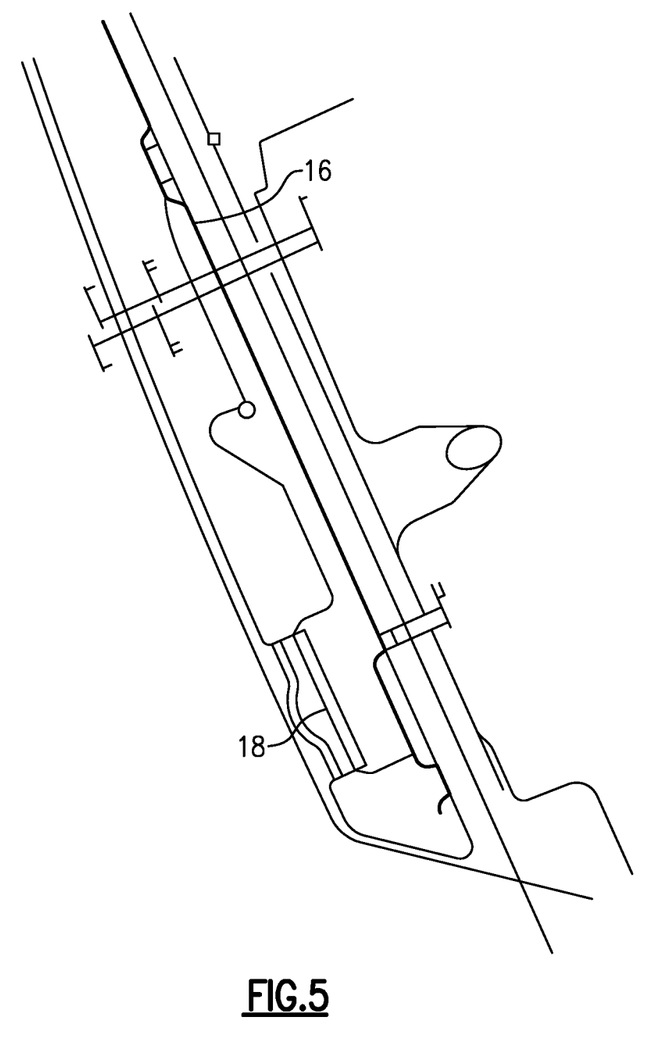
FIG. 5 illustrates a side view of the seat back frame shield of FIG. 3.
Figure 6:
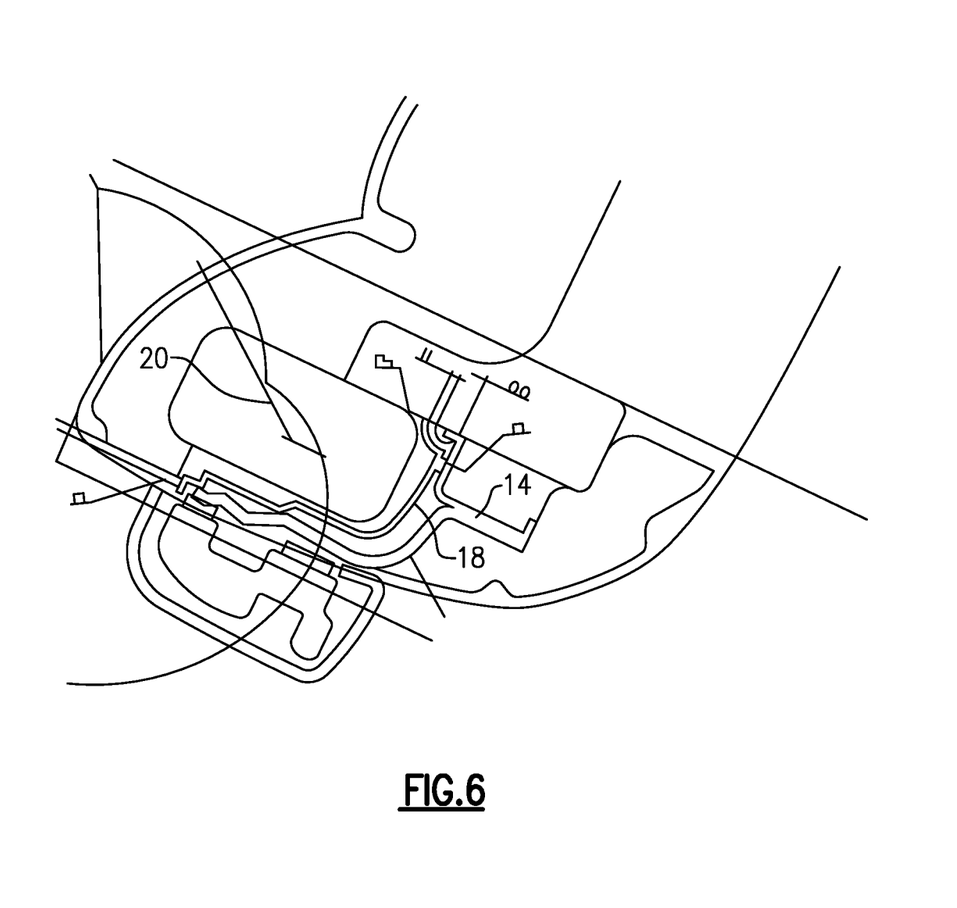
FIG. 6 illustrates a side view of the armrest bracket shield of FIG. 4.

FIGS. 5 and 6 shows side views of the seat back frame shield 16 and the armrest bracket 14 of FIGS. 3 and 4, respectively. FIG. 5 shows a section of the seat back frame shield 16, with the seat back frame 12 on the right and the airbag 20 on the left. The seat back frame shield 16 protects the airbag 20 along an entire length of the seat back frame 12. FIG. 6 shows the armrest bracket shield 18 that covers the armrest bracket 14 that protects the airbag 20.

Figure 7:
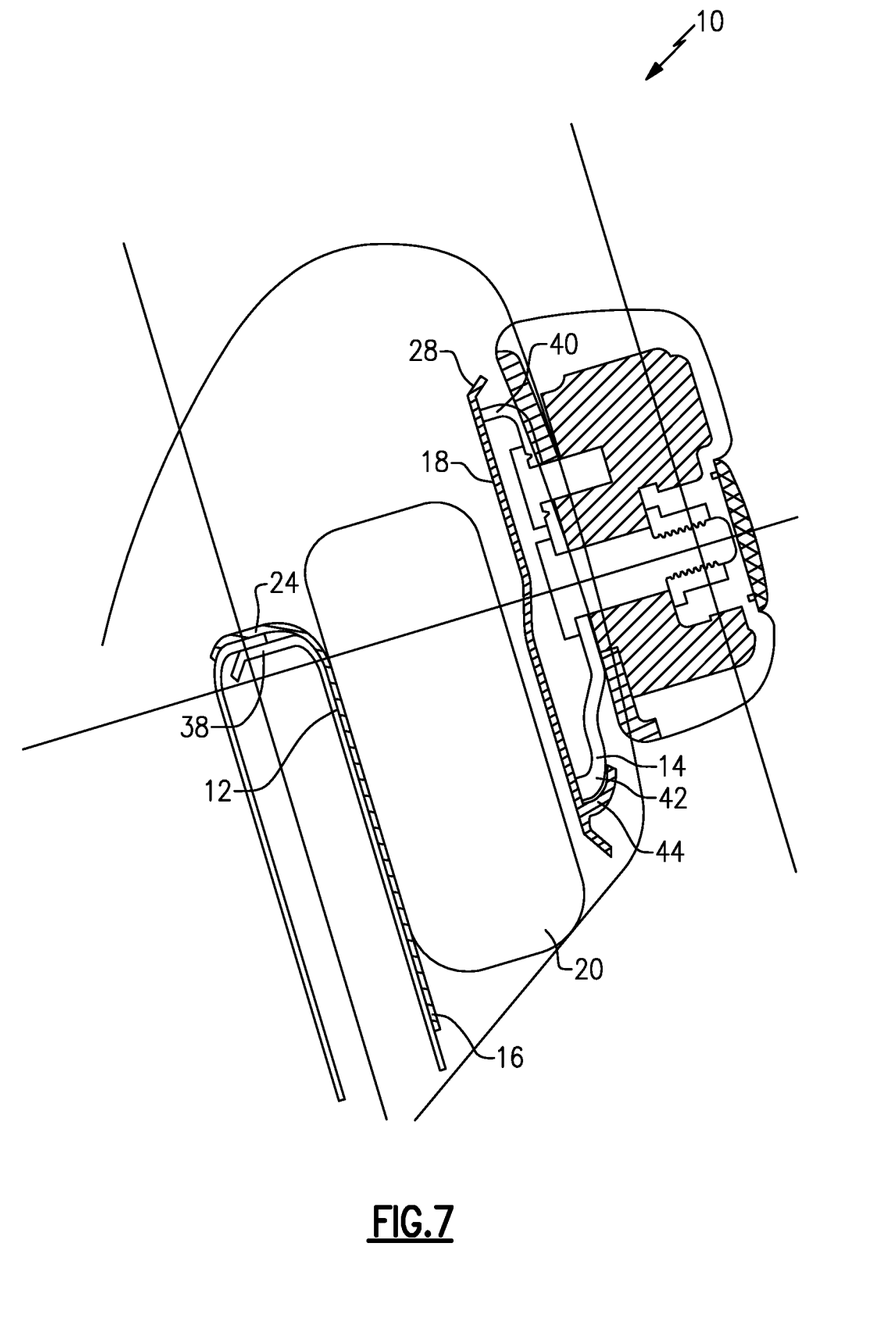
FIG. 7 illustrates a perspective view of an assembled vehicle seat.
Figure 8:
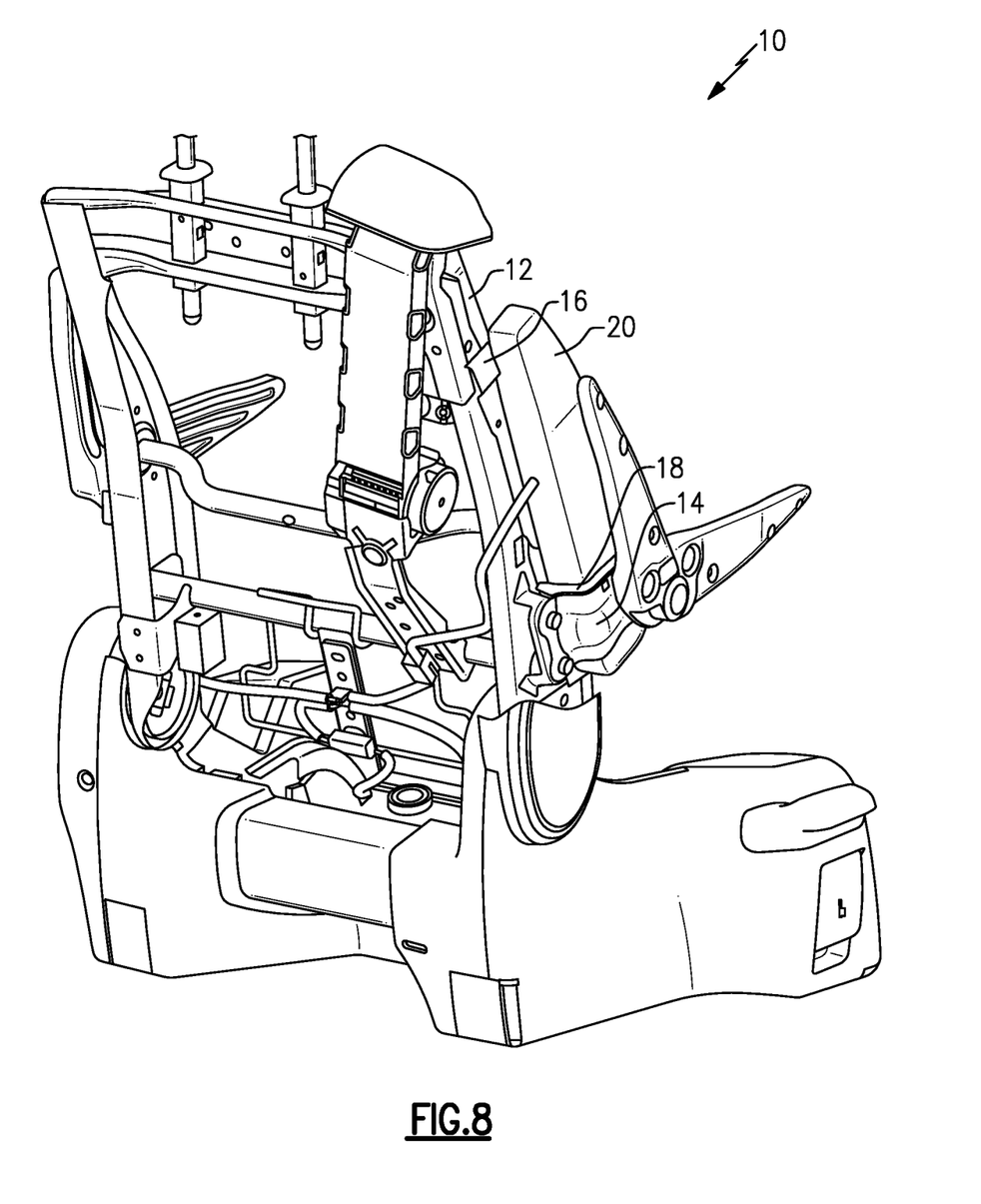
FIG. 8 illustrates a side view of the assembled vehicle seat.

As shown in FIGS. 7 and 8, the seat back frame shield 16 and the armrest bracket shield 18 wrap around the seat back frame 12 and the armrest bracket 14, respectively, to prevent damage to the airbag 20 during deployment of the airbag 20 from features on the seat back frame 12 and the armrest bracket 14. The flange 24 of the seat back frame shield 16 wraps around the flange 38 of the seat back frame 12. The flanges 28 and 44 of the armrest bracket shield 18 wraps around the flanges 20 and 42, respectively, of the armrest bracket 14. The airbag 20 is protected on both an inboard side and an outboard side by the seat back frame shield 16 and the armrest bracket shield 18, respectively. The inboard side is protected by the seat back frame shield 16, and the outboard side is protected by the armrest bracket shield 18.

The seat back frame shield 16 and the armrest bracket shield 18 are contoured to correspond to the shape of the seat back frame 12 and the armrest bracket 14, respectively. A thickness of the seat back frame 12 and the armrest bracket 14 is lower than a nominal thickness used in interior plastics. In one example, the seat back frame 12 and the armrest bracket 14 have a thickness of approximately 1.5 mm, while the nominal thickness used in interior plastics is approximately 2.3 mm. A material specification can withstand high impact load during deployment of the airbag 20. The design of the seat back frame shield 16 and the armrest bracket shield 18 is based on the airbag 20 deployment envelope and potential failure areas of the seat back frame 12 and the armrest bracket 14. There is no contact of the airbag 20 with the seat back frame 12 and the armrest bracket 14.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle seat assembly comprising:
a seat back frame having an edge;
a seat back frame shield having an edge, wherein the seat back frame shield is mounted to the seat back frame and a portion of the seat back frame shield wraps around the seat back frame; and
an airbag, wherein the seat back frame shield protects the airbag from the seat back frame.

2. The vehicle seat assembly as recited in claim 1 wherein the seat back frame includes a flange and the seat back frame shield includes a flange, and the flange of the seat back frame shield engages the flange of the seat back frame.

3. The vehicle seat assembly as recited in claim 1 wherein the seat back frame has a contour and the seat back frame shield has a contour, and the contour of the seat back frame shield correlates the contour of the seat back frame.

4. The vehicle seat assembly as recited in claim 1 wherein the seat back frame shield has a thickness of approximately 1.5 mm.

5. The vehicle seat assembly as recited in claim 1 wherein the seat back frame shield comprises plastic.

6. The vehicle seat assembly as recited in claim 1 further including: an armrest bracket having an edge, wherein the vehicle seat assembly includes an armrest bracket shield having an edge, the armrest bracket shield is mounted to the armrest bracket, and the armrest bracket shield protects the airbag from the armrest bracket.

7. The vehicle seat assembly as recited in claim 6 wherein the armrest bracket includes a first flange and a second flange and the armrest bracket shield includes a first flange and a second flange, and the first flange and the second flange of the armrest bracket shield engages the first flange and the second flange, respectively, of the armrest bracket.

8. The vehicle seat assembly as recited in claim 6 wherein a portion of the armrest bracket shield wraps around the armrest bracket.

9. The vehicle seat assembly as recited in claim 6 wherein the armrest bracket has a contour and the armrest bracket shield has a contour, and the contour of the armrest bracket shield correlates the contour of the armrest bracket.

10. The vehicle seat assembly as recited in claim 6 wherein the armrest bracket shield has a thickness of approximately 1.5 mm.

11. The vehicle seat assembly as recited in claim 6 wherein the armrest bracket shield comprises plastic.

12. A vehicle seat assembly comprising:
an airbag;
a seat back frame having an edge and a flange;
a seat back frame shield having an edge and a flange, wherein the seat back frame shield is mounted to the seat back frame, the edge of the seat back frame shield aligns with the edge of the seat back frame, the flange of the seat back frame shield engages the flange of the seat back frame to protect the airbag from the seat back frame, the seat back frame shield has a thickness of approximately 1.5 mm, and the seat back frame shield comprises plastic;

an armrest bracket having an edge, a first flange, and a second flange; and an armrest bracket shield having an edge, a first flange, and a second flange, wherein the armrest bracket shield is mounted to the armrest bracket, the edge of the armrest bracket shield aligns with the edge of the armrest bracket, the first flange and the second flange of the armrest bracket shield engages the first flange and the second flange, respectively, of the armrest bracket to protect the airbag from the armrest bracket, the armrest bracket shield has a thickness of approximately 1.5 mm, and the armrest bracket shield comprises plastic; and wherein the seat back frame shield and the armrest bracket shield protects the airbag from the seat back frame and the armrest bracket, respectively.

13. The vehicle seat assembly as recited in claim 12, wherein the armrest bracket has a contour and the armrest bracket shield has a contour, and the contour of the armrest bracket shield correlates the contour of the armrest bracket.

14. The vehicle seat assembly as recited in claim 12, wherein the seat back frame has a contour and the seat back frame shield has a contour, and the contour of the seat back frame shield correlates the contour of the seat back frame.

15. A vehicle seat assembly comprising:

a seat back frame having an edge;

a seat back frame shield having an edge, wherein the seat back frame shield is mounted to the seat back frame;

an airbag, wherein the seat back frame shield protects the airbag from the seat back frame; and an armrest bracket having an edge, wherein the vehicle seat assembly includes an armrest bracket shield having an edge, wherein the armrest bracket shield is mounted to the armrest bracket, and the armrest bracket shield protects the airbag from the armrest bracket.

16. The vehicle seat assembly as recited in claim 15, wherein the armrest bracket includes a first flange and a second flange and the armrest bracket shield includes a first flange and a second flange, and the first flange and the second flange of the armrest bracket shield engages the first flange and the second flange, respectively, of the armrest bracket.

17. The vehicle seat assembly as recited in claim 15, wherein a portion of the armrest bracket shield wraps around the armrest bracket.

18. The vehicle seat assembly as recited in claim 15, wherein the armrest bracket has a contour and the armrest bracket shield has a contour, and the contour of the armrest bracket shield correlates the contour of the armrest bracket.

* * * * *